United States Patent [19]
Ladouceur

[11] 3,793,658
[45] Feb. 26, 1974

[54] METHOD OF FORMING A FASTENER
[75] Inventor: Harold A. Ladouceur, Livonia, Mich.
[73] Assignee: Multifastener Corporation, Detroit, Mich.
[22] Filed: June 3, 1971
[21] Appl. No.: 149,518

[52] U.S. Cl.............................. 10/86 F, 151/41.73
[51] Int. Cl............................................... B21k 1/70
[58] Field of Search... 10/72 CN, 76 R, 86 R, 86 A, 10/86 C, 86 CL, 86 F; 85/32 K; 151/41.72, 41.73; 285/202

[56] References Cited
UNITED STATES PATENTS

| | | | |
|---|---|---|---|
| 2,043,101 | 6/1936 | Jesser | 285/202 |
| 2,393,850 | 1/1946 | Wilcox | 10/86 F |
| 2,756,444 | 7/1956 | Schaeffer | 10/86 F |
| 2,814,812 | 12/1957 | Stern | 10/86 F |
| 2,871,492 | 2/1959 | Sciullo | 10/86 F |
| 3,282,315 | 11/1966 | Zahodiakin | 151/41.73 |

Primary Examiner—Charles W. Lanhan
Assistant Examiner—E. M. Combs

[57] ABSTRACT

The method disclosed herein is suitable for forming a fastener having a panel receiving re-entrant groove, such as a piercing nut or fastener having a central pilot portion and a surrounding groove which is restricted at the open end. The method includes impacting the pilot or piercing face of nut blank with a punch having an annular protrusion forming the central pilot portion and a surrounding groove having parallel side walls. The grooved end of the fastener is then forced into a tapered die opening, deforming the outer side wall of the groove inwardly to provide a restricted or re-entrant groove opening. In the disclosed method, the nut blank is first deformed in a hexgonal die and the outer groove wall is also hexagonal. The nut blank is then pierced, through the pilot portion.

10 Claims, 11 Drawing Figures

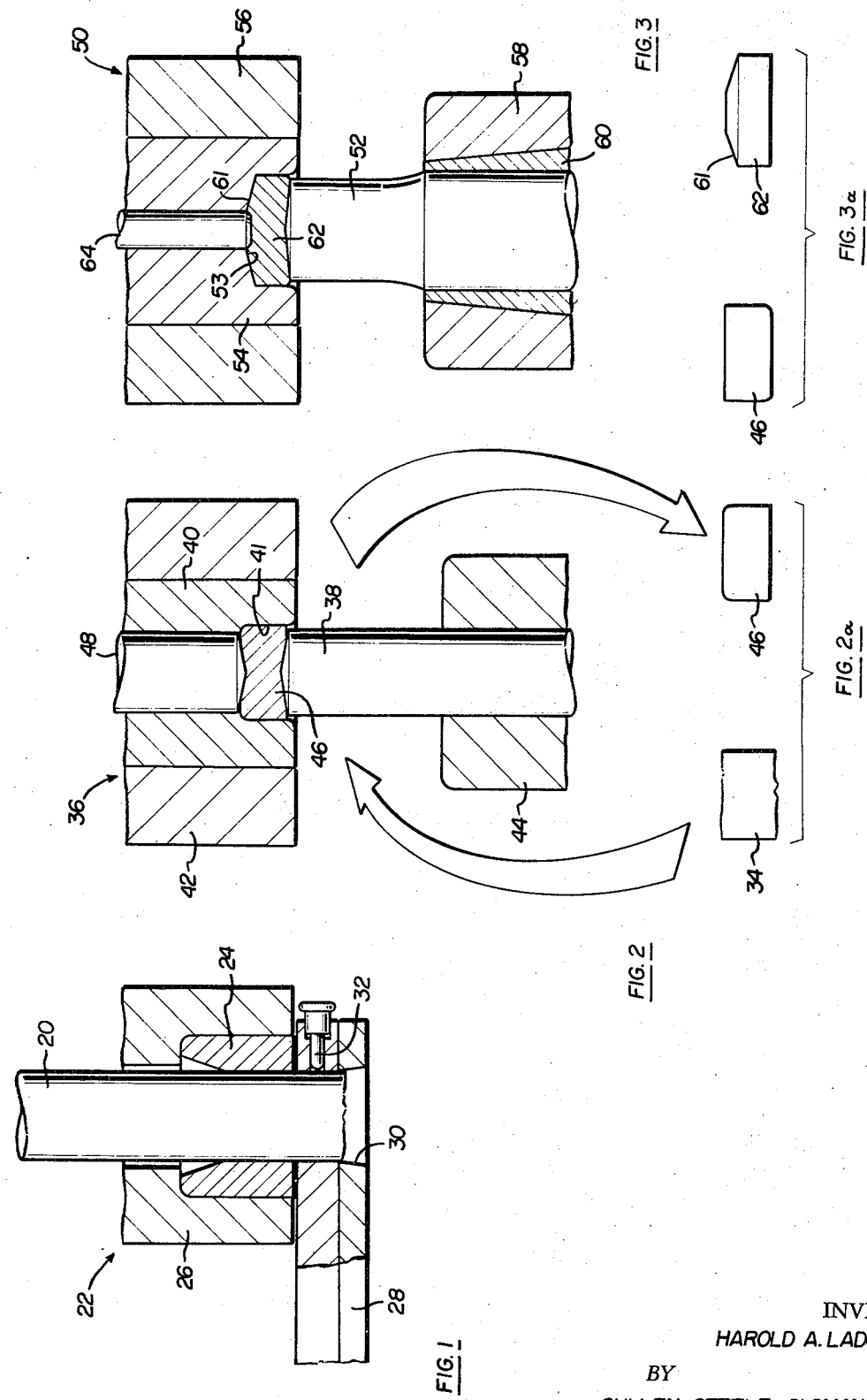

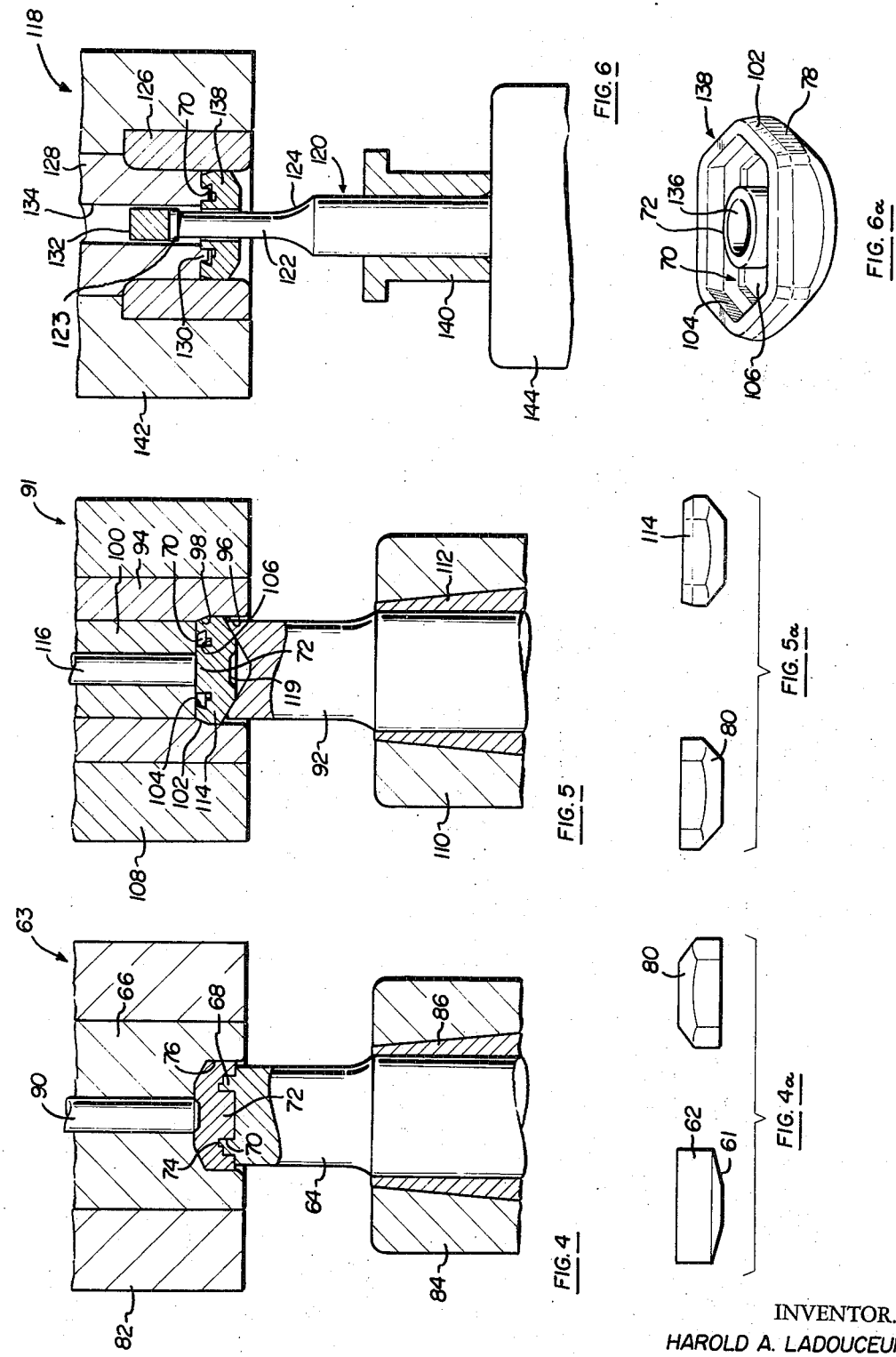

METHOD OF FORMING A FASTENER

FIELD OF THE INVENTION

The improved method of this invention may be performed with a cold header apparatus such as described herein, including a plurality of punches, dies and means for transferring the nut blanks from station to station. The steps of the method are described individually, however it will be understood that all of the steps may be performed simultaneously on a plurality of nut blanks providing a continuous operation.

The method of this invention is particularly suitable for forming a piercing fastener or the like having a central pilot portion and a restricted or re-entrant groove, such as disclosed in the co-pending application of the assignee herein, Ser. No. 90,923, now U.S. Pat. No. 3,724,520. The configuration of the groove in the pierce nut disclosed in the above referenced application includes an inner side wall which is generally perpendicular to the piercing or pilot face and an outer side wall which is divergent to the inner side wall to provide a restricted groove opening, which is referred to herein as a "re-entrant groove." The method disclosed herein is also suitable for forming the configured bottom wall shown in the pierce nut disclosed in the above application, including the stepped tool receiving recess. Reference may be made to the above application for further details of a suitable pierce nut, although the instant application is not limited to the embodiments of the pierce nut disclosed therein.

The method disclosed herein includes impacting one face of a nut blank, such as the pilot of a pierce nut face, with a punch having generally parallel side walls. In the disclosed method, the nut blank is deformed in a polygonal die chamber to deform the exterior of the fastener blank to conform to the die chamber. The disclosed embodiment is generally hexagonal. The grooved end of the fastener blank is then forced into a tapered die opening, which deforms the outer side wall of the groove inwardly to provide the re-entrant groove angle. In the preferred embodiment of the method, the nut blank is rotated 180 degrees, after the forming of the groove, and the opposed end of the fastener is impacted by a punch into the tapered die opening. Where a hexagonal nut is being formed, for example, the die opening is generally hexagonal to receive the hexagonal nut blank.

The fastener blank may thereafter be pierced by a piercing punch or the like, preferably through the face of the fastener opposite the grooved end. In the disclosed embodiment of the method, the fastener is received in a die member having a protrusion which is received in the groove, during piercing, to prevent deformation of the pilot portion. Other advantages and meritorious features of this invention will more fully appear from the following Description of the Method, Claims and accompanying Drawings.

BRIEF DESCRIPTION OF THE DRAWINGS

FIG. 1 is a partially cross sectioned side view of a cut-off tool suitable in the method of this invention;

FIG. 2 is a side cross sectional view of the first punch station, suitable for the method of this invention;

FIG. 2A are side views of the fastener blank before and after forming in the first punch station;

FIG. 3 is a side cross sectional view of the second punch station, suitable for the method of this invention;

FIG. 3A shows the fastener blank before and after forming in the second punch station;

FIG. 4 is a side cross sectional view of the third punch station suitable for the method of this invention;

FIG. 4A shows the fastener blank before and after forming in the third punch station;

FIG. 5 is a side cross sectional view of the fourth punch station suitable for the method of this invention;

FIG. 5A shows the fastener blank before and after forming in the fourth punch station;

FIG. 6 is a side cross sectional view of the piercing station suitable for the method of this invention; and FIG. 6A is a top perspective view of the fastener blank after piercing formed by the method of this invention.

DESCRIPTION OF THE DRAWINGS AND METHOD OF THE INVENTION

The method of forming a fastener of this invention may start with conventional wire or rod stock, such as shown in FIG. 1 at 20. It will be understood that the wire material will depend upon the particular application of the fastener. The disclosed apparatus is particularly suitable for forming a pierce nut or clinch nut, as described in the above referenced application for United States Patent and shown in Figure 6A, however other fasteners may also be formed by the method of this invention. Further, the disclosed method is not limited to the particular apparatus shown, except where so limited by the claims. In the disclosed apparatus, a circular wire stock may be utilized, such as SAE 1018 steel wire.

The wire stock 20 is first cut into suitable lengths by a cut-off tool, such as shown at 22 in FIG. 1. The wire stock is received in the bearing insert 24 of the cut-off tool against an adjustable stop, not shown, through the cut-off blade 28. The insert 24 is retained in a suitable holder 26. The cut-off blade may be a conventional two-piece blade, as shown in FIG. 1, wherein the wire receiving aperture is tapered at the open end to receive the punch in the first punch station, as described hereinbelow. The cut-off blade moves to the right in FIG. 1, shearing the wire at the interface between the blade and the bearing insert 24. The loose slug 34 is retained in the blade aperture 30 by a conventional retaining pin 32, which is normally spring actuated. The blade continues to move to the right in FIG. 1, until the slug 34 is aligned with the first station punch 38.

The first punch station 36 is a squaring station, wherein the punch 38 is actuated through the aperture 30 in the cut-off tool to force the rough slug 34 into the die 40, as shown in FIG. 2. The force of the punch 38 is sufficient to cause the slug 34 to fill the cavity 41 of the die, shaping the blank 46 for the later forming operations. In the disclosed apparatus, the die 40 is retained in a conventional holder 42 and the punch 38 is retained in a sleeve 44. After forming of the fastener blank 46, the punch 39 is retracted, allowing the cut-off blade 38 to return to its initial position, as shown in FIG. 1. As the blade 28 clears the die 40, the blank 46 is ejected from the die 40, by knock-out pin 48, into a transfer mechanism which is not shown. It will be understood that the various details of the punch stations, cut-off tool 22 and the transfer mechanism have not been shown because these tools are well known in the art and do not form part of the disclosed invention, except as described herein. The transfer mechanism is adapted to retain the fastener blank 46 and transfer the blank to the second punch station 50, which is shown in FIG. 3. In the disclosed embodiment, the fastener blank is also rotated 180 degrees, as shown in FIG. 3A, for receipt in the second punch station.

The second punch station 50, shown in FIG. 3, is a doming station, wherein the fastener blank 46 is reduced in thickness, with a corresponding increase in diameter. Upon receipt of the blank from the transfer mechanism, not shown, the punch 52 engages the fastener blank 46 with sufficient force to fill the cavity 53 of the die 54. A slight angle, such as 15 degrees, is formed on the inner side 61 of the fastener blank 62 as shown in FIG. 3. The "dome" configuration makes the metal of the blank easier to work and starts the metal flowing inwardly. In the particular embodiment of the fastener shown, the mass of metal is preferably deformed toward the center of the blank to permit forming of the pilot portion, as described hereinbelow. After forming of the fastener blank 62, as shown in FIG. 3A, the punch 52 is retracted and the part is ejected by the knock-out pin 64 into the transfer mechanism, not shown. In this embodiment, the die 54 is retained by the holder 56, which may be identical to the holder 42 in FIG. 2, and the punch 52 is retained by sleeve 58 and collet 60.

The fastener blank is then transferred by the transfer mechanism to the third punch station 63, as shown in FIG. 4A, and is again rotated 180 degrees for forming in the third punch station. Upon receipt from the transfer mechanism, the punch 64 is actuated to force the nut blank 62 into the die 66, causing the nut blank to fill the cavity of the die. The punch 64, in this embodiment, includes an annular projection 68 which forms a corresponding groove 70 in the nut blank and a central, generally circular pilot portion 72. In this embodiment, the annular projection includes a stepped portion 74 which forms a tool receiving recess upon installation of the pierce nut in a panel, as described in the above referenced application for United States patent. The die chamber 76 for the disclosed embodiment of the nut is generally hexagonal to form a hexagonal exterior wall 78 on the nut blank 80. It will be noted that the side walls of the annular projection 68 and the corresponding groove 70 are generally parallel and perpendicular to the face of the pilot portion 72. Further, in this embodiment, the pilot portion and the corresponding groove are hexagonal, providing side walls of the groove which are parallel to the hexagonal exterior walls 78. Reference may be made to FIG. 6A for the hexagonal groove configuration The die 68, in this embodiment, is retained by a holder 82, which may be identical to the holder 42 as described above, and the punch 64 is retained in the sleeve 84 by collet 86. After forming of the nut blank 80, as described above, the nut blank is ejected from the die cavity 76 by knock-out pin 90, into a transfer mechanism for transfer of the blank to the fourth punch station 91, shown in FIG. 5.

The transfer mechanism is again adapted to rotate the fastener blank 80 180 degrees, as shown in Figure 5A, for delivery to the fourth punch station 91. The punch 92 receives the blank 80 from the transfer mechanism and forces the blank into the die 94, as shown in FIG. 5. The die cavity includes parallel sides 96, at the open end, which terminate in a tapered opening 98, wherein the blank is received against the bottom wall of the die insert 100. The tapered wall 98 of the die deforms the grooved end of the fastener blank inwardly to form a chamfer 102 and deforms the outer side wall 104 of the groove 70 to overlie the bottom wall 106 and provide the re-entrant groove described hereinabove. The stepped bottom wall 106 provides the tool receiving recess described hereinabove and in the above referenced application for United States patent. As described hereinabove, the die 94 and insert 100 are retained by the holder 108 and the punch 92 is retained in the sleeve 110 by the collet 112. After forming of the fastener blank 114, the blank is ejected from the die by the knock-out pin 116 into a transfer mechanism, not shown, for transfer to the piercing station 118, as shown in FIG. 6.

The pierce 120 in the disclosed embodiment of the apparatus includes a reduced diameter portion 122, which receives the fastener blank from the transfer mechanism, and a curved or radiused portion 124 whose purpose will be described hereinbelow. The reduced diameter portion 122 is received in the recess 119 of the nut blank, forcing the nut blank into the opening of the die 126. It will be noted that the transfer mechanism does not rotate the nut blank from the fourth die station to the piercing station. The die insert 128, in this embodiment, includes an annular projection 130 which is received in the annular groove 70 to prevent deformation of the pilot during the piercing operation. After the fastener blank is bottomed in the die 126, against the die insert 128, the reduced portion 122 of the pierce pierces a slug 132 through the pilot portion 72 of the fastener and ejects the slug through the aperture 134 in the die insert. It will be noted that the pierce preferably engages the fastener blank at the face opposite the pilot portion 72 to avoid deformation of the groove. The finished blank is shown in FIG. 6A and includes the generally hexagonal body portion 78, the divergent inner wall 104 formed in the fourth punch station, the hexagonal groove 70, which was formed in the third punch station, and the pierced aperture 136. The aperture 136 may then be tapped in a conventional tapping machinee and the pierce nut is ready for installation.

The pierce nut blank 138 is removed from the die cavity by the pierce 120. In this embodiment, the pierce has an enlarged end portion 123 which engages the nut blank upon retraction of the pierce and withdraws the blank from the die cavity. The blank is then ejected when the pierce is retracted through the stripper bushing 140. The die 126 and insert 128, in this embodiment, are retained by a holder 142, as described above, and the pierce is reciprocally received through a sleeve 144.

I claim:

1. A method of forming a nut in a die apparatus having a configured punch and die, said nut having a central cylindrical bore and a panel receiving groove surrounding said bore in one end of said nut, the outer side wall of said groove tapered inwardly to define a re-entrant angle, including the steps of:
   a. disposing a nut blank having parallel side walls in a die chamber closely receiving and retaining said nut blank,
   b. impacting said one end of said nut blank retained within said die opening with a configured punch having an annular protrusion on the impacting end of said punch, said protrusion having generally parallel side walls and forming an annular groove in said one end of said nut blank, and c. forcing said one end of said nut blank into a configured die opening having a conical end portion, the minor diameter of said die conical end portion having a diameter smaller than said nut blank, deforming said parallel outer side walls of the nut blank and said outer wall of said groove inwardly to provide a restricted re-entrant opening and inwardly inclined outer side wall adjacent said one end of the nut.

2. The method defined in claim 1, wherein the fastener blank is rotated 180 degrees after impact and the blank is impacted by a punch to force the grooved end of the blank into said configured die opening.

3. The method defined in claim 1, wherein the fastener blank is impacted by a punch into a female die member having a regular polygonal die chamber to deform the exterior of the fastener blank to correspond to said die chamber and said punch protrusion is annular and polygonal and generally concentric with the exterior of said fastener blank, such that the side walls of the groove are formed generally parallel to the exterior walls of the fastener blank.

4. The method defined in claim 3, wherein said configured die chamber is generally hexagonal and said groove is formed generally hexagonal.

5. The method defined in claim 3, wherein said punch protrusion is stepped, such that said one face of the fastener blank is deformed to provide concentric regular polygonal groove portions each portion having side walls generally parallel to the external walls of the fastener blank.

6. The method defined in claim 1, wherein the fastener blank is generally polygonal and said blank is pierced through the face of the blank opposite said one face generally in the axis of the blank.

7. The method of forming a polygonal fastener having a central pilot portion and a tapered re-entrant groove opening substantially surrounding said pilot portion, comprising;

a. deforming a fastener blank in a die having parallel side walls defining a polygonal die chamber, forming a polygonal exterior wall on said fastener blank, b. impacting one face of the fastener blank in a polygonal die chamber with a punch having a substantially continuous annular protrusion on its impacting end generally concentric to said polygonal exterior wall of the fastener blank, forming a groove in said one face having generally parallel side walls and a central pilot portion, and c. forcing the grooved end of said fastener blank into a tapered polygonal die opening generally conforming to the polygonal exterior wall of the fastener inwardly to define inclined outer side walls and constricting the opening of said groove to provide a tapered re-entrant groove opening.

8. The method defined in claim 7, wherein said fastener blank is thereafter received in a second die member having an annular protrusion conforming to said groove, received within said groove, and said fastener blank is pierced through the face of said blank, opposite said grooved end, through said pilot portion.

9. The method defined in claim 7, wherein said punch protrusion is generally polygonal with side walls generally parallel to said exterior walls of the fastener.

10. The method defined in claim 9, wherein said punch protrusion is generally hexagonal and includes a hexagonal extension at the inner end, adjacent the axis of the protrusion, such that said one face of the fastener blank is deformed to provide concentric hexagonal groove portions, each portion having side walls generally parallel to the exterior walls of the fastener blank.

* * * * *